UNITED STATES PATENT OFFICE.

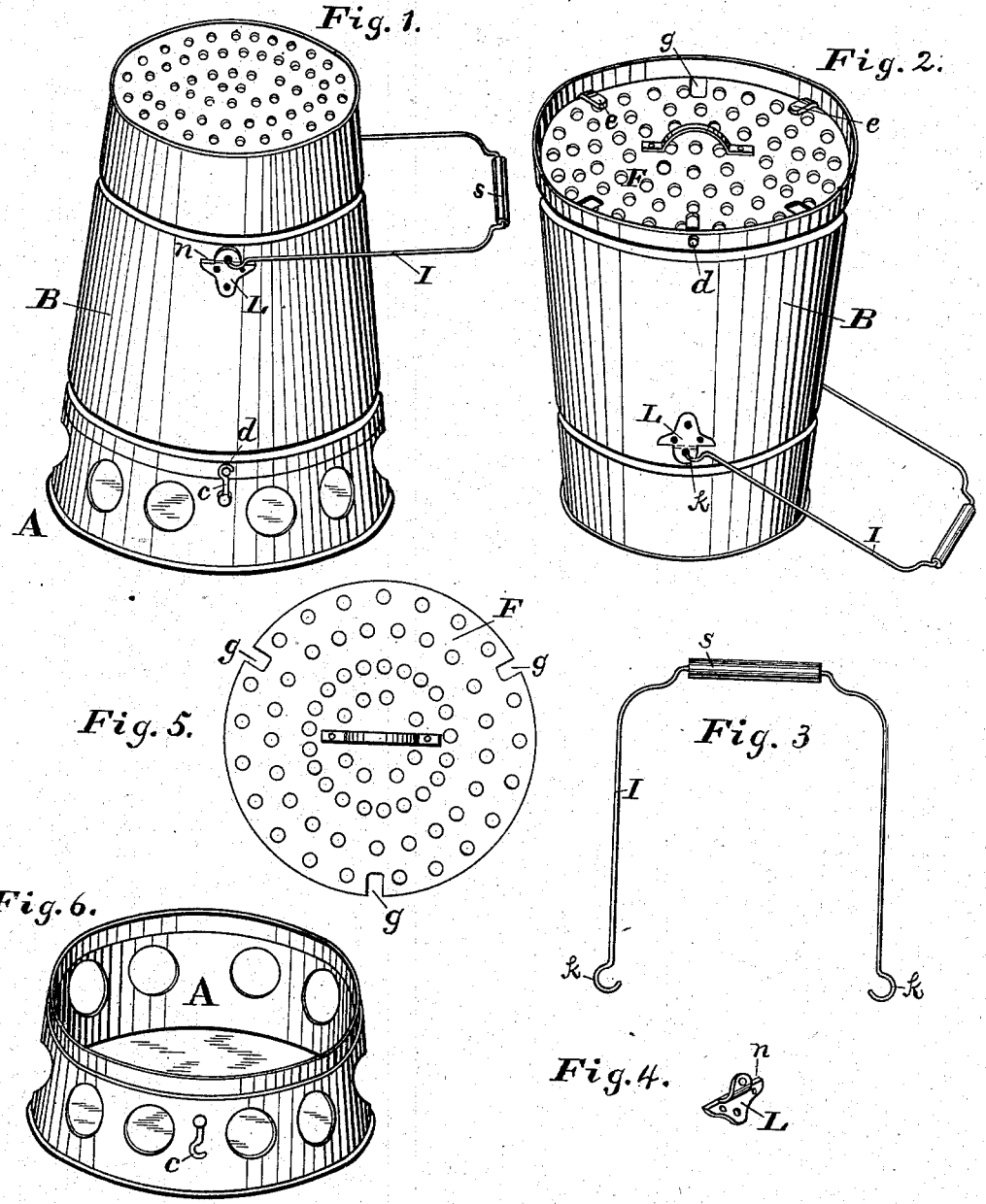

HERMANN PERLICH, OF BALTIMORE, MARYLAND.

INSECT-DESTROYER.

SPECIFICATION forming part of Letters Patent No. 289,553, dated December 4, 1883.

Application filed March 19, 1883. (No model.)

*To all whom it may concern:*

Be it known that I, HERMANN PERLICH, a citizen of the United States, residing at Baltimore and State of Maryland, have invented certain new and useful Improvements in Insect-Destroyers, of which the following is a specification, reference being had therein to the accompanying drawings.

My invention relates to a certain improvement in fumigators for which Letters Patent of the United States were granted to me February 27, 1883, No. 273,144.

The apparatus will first be described, and the invention then be designated in the claims.

In the drawings hereto annexed, Figure 1 is a side view of the fumigator. Fig. 2 is a view of the fire-pot inverted. Fig. 3 shows the bail detached. Fig. 4 is the bail-ear. Fig. 5 is a view of the detachable grate. Fig. 6 is a view, separately, of the base or ash-pan.

The letter A designates the base or ash-pan, to which the fire-pot B is connected by the hooks $c$ on the base engaging with the knobs $d$ on the fire-pot. The walls of the fire-pot are cylindric and tapering, the large end being normally down and the small end up. The top plate of the fire-pot is perforated all over to afford escape for the fumes, and said top is rigidly fixed to its position, and is not intended to be removed. The lower end of the fire-pot is provided with lugs $e$, which project inwardly from the wall, and the removable grate or bottom F has notches $g$ on its rim. The notches permit the grate to enter past the lugs, after which a slight or partial turn of the grate secures it in position.

The bail-ears L are attached to the tapering cylindric sides of the fire-pot intermediate of the small and large ends—that is, some distance below the top—whereby to facilitate the reversal of the fire-pot. At each side of the hole in the ear, where the bail-hook engages, is a shoulder, $n$, which serves to sustain the bail, as hereinafter set forth, in a horizontal position.

The bail I is made of wire, each end terminating in a peculiar-shaped hook, $k$, which engages with the ears on the fire-pot. The hook, it will be seen, is open. The point of the hooks $k$ at each end project inward, or toward each other; but a large part of the curved portion of each hook projects outward. I construct the bail in this way because it is designed to leave the hook open, in order that the bail may be detached from the ears when desired, and at the same time it is designed that when the bail occupies a horizontal position the angular part, which joins the curved portion of the hook to the straight part of the bail, shall be adapted to come in contact with the supporting-shoulders $n$. The construction of the bail and shoulder at each side of the ear enables the bail to be dropped and to supported at a horizontal position, as shown in Fig. 1, where the hand-grasp $s$ is free from the currents of heat which ascend from the top perforated plate, and yet in an elevated position, where it may be conveniently taken hold of when it is desired to move the apparatus. As already stated, an advantage of the peculiar construction of the bail is that it may be readily unhooked, which is a desideratum, and it is of such limited size that it presents no obstacle to close packing for shipment, thus overcoming another objection to the bail shown in my former patent.

When the fumigator is to be filled or charged with material for producing fumes, it is reversed from its normal position and stood with the large end uppermost, in which position the grate may be readily removed and the material crowded down in the small end. The advantage of the tapering cylindric sides, with the removable grate at the large lower end and the wire bail attached to ears secured directly to the sides of the fire-pot, is that while, as in my former patent, when packing the fire-pot, the material may be crowded into the small end, the bail, as now applied to the fire-pot, remains attached thereto during this operation, although the latter is reversed or turned upside down. Therefore, as now applied, the bail is a means to assist in reversing, which is not the case when constructed as shown in my former patent.

Having described my invention, I claim and desire to secure by Letters Patent of the United States—

1. A fumigator having a tapering cylindric fire-pot, B, provided at its large lower end with a removable grate and at its small upper end with a perforated plate, and a wire bail, I, attached to ears secured to the sides of the pot intermediate of the large and small ends, as shown and described.

2. A fumigator consisting of a tapering cylindric fire-pot, B, having at its large lower end a removable grate, and an ash-pan, A, detachably connected below the said grate, and at its small upper end a perforated plate, and provided with bail-ears secured to the sides of the fire-pot intermediate of the large and small ends, and a bail having open hooks for attachment to the ears, as shown and described.

In testimony whereof I affix my signature in presence of two witnesses.

HERMANN PERLICH.

Witnesses:
   JNO. T. MADDOX,
   JOHN E. MORRIS.